Aug. 8, 1939. W. H. BERGEY 2,168,859
LIQUID-FUEL-BURNING APPARATUS
Filed March 8, 1937
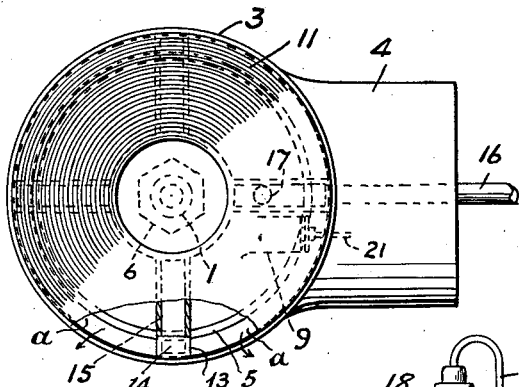
FIG. 3.
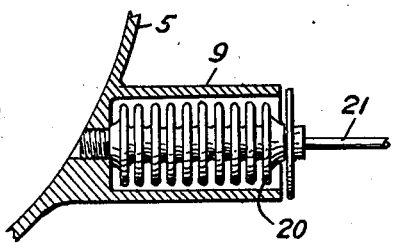
FIG. 4.
FIG. 5.
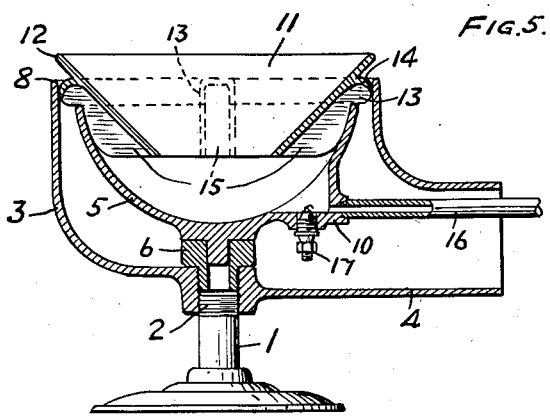
FIG. 1.
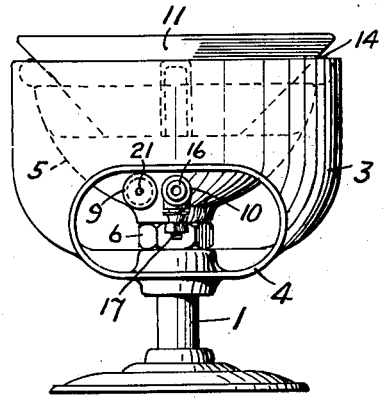
FIG. 2.
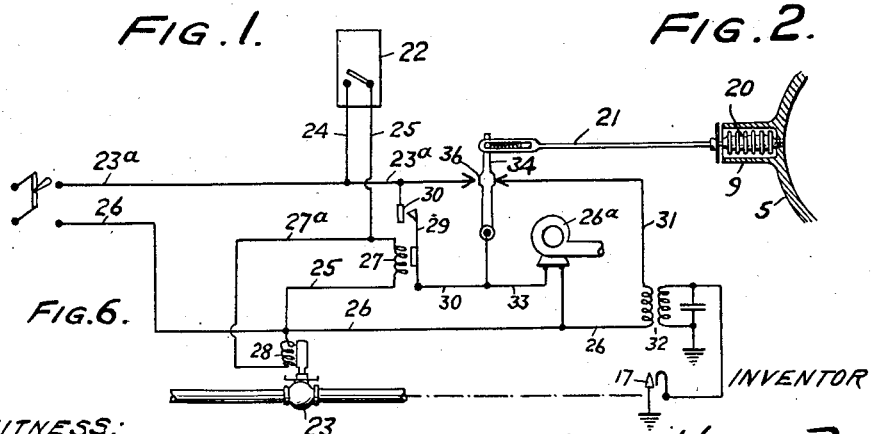
FIG. 6.
WITNESS:
Robt. B. Mitchel
INVENTOR
William Henri Bergey
BY
Augustus B. Stoughton.
ATTORNEY.

Patented Aug. 8, 1939

2,168,859

UNITED STATES PATENT OFFICE 2,168,859

LIQUID-FUEL-BURNING APPARATUS

William Henri Bergey, Sumneytown, Pa.

Application March 8, 1937, Serial No. 129,533

4 Claims. (Cl. 158—91)

The objects of the present invention are to produce in a simple manner a sootless and efficient flame from fuel oil or distillates for heating systems; to eliminate all electrical or mechanical timing devices; to avoid starting failures; to make all vital parts easily accessible without dismantling the burner; to operate with the minimum of attention and generally to provide an economical, simple and efficient oil burner for household or space heating purposes as it is sometimes called.

Other objects of the invention will appear from the following description at the end of which the invention will be claimed.

Generally stated the invention consists in control means operated by the temperature of the burner as distinguished from electrical or mechanical timing devices; it also consists in a spark plug of special design and peculiarly adapted for use in combination with other parts of the burner. It also consists in the construction and disposition of parts whereby access may be had to them for repair or replacement without dismantling the burner and it also consists in the improvements to be presently described and finally claimed.

In the following description reference will be made to the accompanying drawing forming part hereof and in which:

Figure 1 is an elevational view principally in central section illustrating a burner embodying features of the invention.

Fig. 2 is an end view of the same.

Fig. 3 is a top or plan view showing some of the concealed parts in dotted lines.

Fig. 4 is a sectional view drawn to an enlarged scale and illustrating a Sylphon bellows type of thermostat for actuating the control means.

Fig. 5 is an elevational view drawn to an enlarged scale and illustrating the spark plug; and Fig. 6 is a diagrammatic view illustrative of one type of control means.

Referring to the drawing, 1 indicates a pedestal threaded as at 2. 3 is a body having a circular opening at its top and a laterally extending tubular neck 4 of oval cross section. 5 is an open top bowl adjustably mounted in the body 3, by means of a nut 6, and its circular upper rim 7 is disposed below and concentric with the circular opening at the top rim 8 of the body 3, and the bottom of the bowl 5 is disposed above the bottom of the body. This bowl is provided with a tubular offset 9, and with an offset chamber 10 extending laterally into the neck of the body. There is a deflector 11 of the form of a conic frustum, and its large open end 12 is disposed above and spaced from the rim 8 of the circular opening at the top of the body providing an annular burner opening. The deflector may be made in two parts and it is provided externally with feet 13 resting on the rim 7 of the bowl. The deflector 11 may be made in two parts which abut at a diameter intermediate of the feet and each consisting of a half ring. The channels 15 formed by feet 13 are closed at the top 14 and open downwardly and terminate above the bottom of the bowl and communicate with the interior of the body. 16 indictaes an oil supply pipe arranged thru the tubular neck 4, and entering the offset 10 at the bottom of the bowl. The pipe 16 is supplied with liquid fuel by gravity. 17 indicates a spark plug and it is arranged thru the wall of the bowl adjacent the oil inlet 16. The spark plug is equipped with a conical electrode or ground 18 and with a downturned electrode 19. The spark gap is arranged between the electrodes 18 and 19. 20 is a Sylphon bellows and it is selected as a type of thermostat. The Sylphon bellows is arranged in the chamber provided by the extension 9 of the wall of the bowl 5 so that the Sylphon bellows is responsive to the temperature of the bowl and it controls the spark, the oil feed and the blower, providing a simple and reliable control. It may be remarked that the spark plug 17, the oil feed 16 and the nut 6 are easily accessible thru the tubular neck 4 for adjustment or replacement, and this is true of other parts of the burner.

Referring to Figure 6, a description will be given of one type of means operated by the rod 21 of the Sylphon bellows 20 for controlling the burner.

22 indicates the usual house thermostat; 23 the oil valve and 26ª the blower, which is connected with the neck 4. As shown in Fig. 6, it is assumed that the burner is extinguished and the thermostat 22 is in off position. If the thermostat 22 calls for heat a circuit from the lead 23ª thru the thermostat and by the conductors 24 and 25 to the lead 26 is established. There is also established a circuit by the branch 27ª to the lead 26 and the coils 27 and 28 are therefore energized. The coil 27 closes the relay 29 which establishes a circuit 30 from lead 23ª by branch 31 thru the ignition device 32 for the spark to the lead 26 and thru another branch 33 to the lead 26. This latter circuit is appropriate for controlling and starting the blower 26ª. When the coil 28 is energized the fuel valve 23 is opened and when it is deenergized the fuel valve is automatically closed by means too well understood to require illustration.

Under the conditions recited the blower is in operation; fuel is fed to the bowl 5, and the spark plug is active to cause ignition.

The mode of operation of the burner may be described as follows:

Oil enters the bowl 5 in the form of a film which is ignited at its surface by a spark between the electrodes 18 and 19. If for any reason ignition fails there is a repetition of the spark between these electrodes at the surface of the rising oil film so that the oil is ignited and burns in the bowl 5. There is an up-draft thru the arcuate passages a at the deflector between the feet and there is a down-draft thru the channels defined by the feet into the bowl. There is also a down or inward draft thru the deflector into the bowl. Air under pressure from the blower or by reason of a forced draft escapes at the rim of the body 3 through the passages a, and some of the air descends between the hollow feet 15 as a down draft into the bowl 5 because the channels formed by the feet are covered at their tops. The result is that the mixture of air and oil vapor burns and the combustion initiated in the bowl takes place at the top of the body. As a result of this the Sylphon bellows is heated and its rod 21 is moved toward the left in Fig. 6, thus cutting the ignition coil or device 32 out of circuit and establishing a blower circuit from 23 thru the contact arm 34, so that the blower continues to operate and oil is supplied until the circuit is broken at the thermostat 22. The described operations are repeated in the normal operation of the device, it being remembered that when the coil 28 is de-energized the self closing valve in the oil line closes. In starting the channels 15 which are closed at their tops supply down draft to the flames rising from the surface of an ignited film of oil in the bottom of the bowl for supporting combustion. In operation the arcuate passages a are the burner tips at the root of the flames.

In some cases the burner may operate under natural draft and in that case the Sylphon bellows 20 is adapted to control the spark and the fuel valve. It may be remarked that the function of the nut 6 is to raise and lower the bowl 5 and parts carried thereby in order to vary the effective area of the arcuate passes a in respect to the rims of the body 3 and the deflector 12.

It will be obvious to those skilled in the art to which the invention relates that modifications may be made in details of construction and arrangement without departing from the spirit of the invention which is not limited in respect to such matters or in respect to matters of mere form or otherwise than the prior art and the appended claims may require.

I claim:

1. A burner comprising, in combination, a hollow body having a circular opening at its top and a laterally extending neck through which a draft of air enters, an open top bowl mounted in the body with the circular upper rim of its imperforate wall disposed below and concentric with the circular opening at the top of the body providing a generally annular space, means for introducing liquid fuel to and igniting it in the bowl, a hollow frusto conical open-ended deflector mounted in and spaced from the bowl with its smaller open end toward the bottom of the bowl and with the wall of its larger open end flaring above said annular space and above the rim of the body, said deflector also provided externally with downwardly extending channels closed at their tops and communicating with the body and with the interior of the bowl, said channels adapted to conduct a part of the air at said annular space down into the ignited vapor in the bowl.

2. A burner comprising in combination, a hollow body and a super-posed bowl and a superposed frusto conic deflector concentrically arranged in spaced and nested relation, and each having a circular open top, defined by a substantial wall, the rims of the tops being arranged at different levels with the bowl rim lowest, and the body rim next and the larger end of the deflector at the top and spaced from and flaring outwardly over the other two, means for introducing liquid fuel into the bowl, means for passing air into the body and upwards between it and the outside of the bowl, channels having closed tops and communicating with the space between the bowl and body and opening into the interior of the bowl.

3. An oil burner comprising, in combination, a pedestal, a hollow body mounted on the pedestal and having a circular opening at its top and a laterally extending tubular neck, an open top bowl adjustably mounted in the body with the circular upper rim of its imperforate wall disposed below and concentric with the circular opening at the top of the body and with its bottom disposed above the bottom of the body and having an offset chamber and a tubular offset thereon extending laterally into the neck of the body, a deflector of hollow frusto conic form having the wall of its larger open end disposed above and spaced from the rim of the circular opening at the top of the body providing an annular burner opening, said deflector externally provided with feet resting on the rim of the bowl and with closed top downwardly opening channels terminating above the bottom of the bowl and communicating with the interior of the body, and an oil supply pipe carried in the tubular neck and entering the offset chamber at the bottom of the bowl.

4. In a burner the combination of a hollow body having a rim, a bowl arranged in the body and having a rim, a deflector of the form of a hollow conic-frustum having a rim and provided with spaced feet defining downwardly extending channels closed at their upper portions and said feet seated in the bowl and a nut interposed between the bowl and body for the purpose of adjusting the rims of the bowl and deflector in respect to the rim of the body.

WILLIAM HENRI BERGEY.